(12) United States Patent
Brisebois

(10) Patent No.: US 8,078,769 B2
(45) Date of Patent: Dec. 13, 2011

(54) AUTOMATIC QOS DETERMINATION WITH I/O ACTIVITY LOGIC

(75) Inventor: Arthur Brisebois, Cumming, GA (US)

(73) Assignee: AT&T Mobility II LLC, Atlanta, GA (US)

(*) Notice: Subject to any disclaimer, the term of this patent is extended or adjusted under 35 U.S.C. 154(b) by 291 days.

(21) Appl. No.: 12/326,203

(22) Filed: Dec. 2, 2008

(65) Prior Publication Data

US 2010/0138565 A1 Jun. 3, 2010

(51) Int. Cl.
*G06F 3/00* (2006.01)
*G06F 5/00* (2006.01)
(52) U.S. Cl. .......................... 710/18; 710/40
(58) Field of Classification Search .............. 710/18, 710/40
See application file for complete search history.

(56) References Cited

U.S. PATENT DOCUMENTS

| | | | |
|---|---|---|---|
| 2003/0037150 A1* | 2/2003 | Nakagawa | 709/229 |
| 2004/0240383 A1* | 12/2004 | Davolos et al. | 370/230 |
| 2005/0014509 A1* | 1/2005 | Semper et al. | 455/452.2 |
| 2005/0094560 A1* | 5/2005 | Montes Linares | 370/230 |
| 2005/0180397 A1* | 8/2005 | Yeom | 370/352 |
| 2007/0133428 A1* | 6/2007 | Taylor et al. | 370/252 |
| 2007/0259673 A1* | 11/2007 | Willars et al. | 455/453 |
| 2007/0294410 A1* | 12/2007 | Pandya et al. | 709/226 |
| 2008/0133599 A1* | 6/2008 | Stewart et al. | 707/104.1 |

* cited by examiner

*Primary Examiner* — Henry Tsai
*Assistant Examiner* — Kris Rhu
(74) *Attorney, Agent, or Firm* — Turocy & Watson, LLP

(57) ABSTRACT

Systems and methodologies for automatic quality of service (QoS) management for data network devices are provided herein. As described herein, active versus inactive interaction between a user and a network device can be identified, based on which an appropriate QoS level can be applied to the device. For example, a level of input/output (I/O) activity associated with a device can be inferred by monitoring mouse movement, touch input activity, display output activity, voice I/O activity, or the like, and a QoS configuration can be automatically selected for the device based on the inferred level of activity. As further provided herein, I/O activity monitoring and a corresponding QoS assignment can be related to an activity timer, such that a high-priority QoS setting is applied to devices for which I/O activity is identified within the timer and a low-priority QoS setting is applied to devices for which such activity is not identified.

19 Claims, 15 Drawing Sheets

AUTOMATIC QOS DETERMINATION WITH I/O ACTIVITY LOGIC

TECHNICAL FIELD

The following disclosure relates generally to network communications, and more particularly to techniques for prioritizing communication within a network.

BACKGROUND

As fixed and mobile computing devices increase in prevalence and processing power, the use of data networks connecting such devices has similarly grown in popularity. However, wired and/or wireless data networks often perform differently under various loading conditions. For example, when served by a heavily loaded data network, a user device can generally experience lower data throughput and higher latency. In some data networks, this network performance degradation can be dependent on the nature of the activity in which the user device is engaged. For example, a user device actively involved in an application, such as requesting and/or viewing a web page or the like, can be more likely to notice data network degradation than a user device that is more passively involved in an application, such as reception of an e-mail or a large file transfer.

Conventionally, data networks generally handle all subscriber devices equally under all circumstances. Accordingly, if network degradation caused by loading and/or other factors nears acceptable limits, such networks often require capacity upgrades to be implemented for all subscribers. However, due to the respective requirements of the subscribers, the subscribers may or may not notice or appreciate these upgrades. As a result, such upgrades can introduce unnecessary costs for a data service provider. Other existing data networks attempt to differentiate between subscribers based on their respective quality of service (QoS) requirements, but the techniques utilized by these networks can be prohibitively complex and/or inefficient and are generally not effective in all cases. Accordingly, it would be desirable to implement techniques for managing a data network that mitigate at least the above shortcomings.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate traffic prioritization for respective devices operating within a wired or wireless data network. In accordance with various aspects described herein, mechanisms are employed to identify active versus inactive interaction between a user and a network device and to subsequently apply an appropriate level of QoS priority to the device based on the identified level of interaction.

In accordance with one aspect described herein, input/output (I/O) activity sensing can be employed to automatically change QoS attributes of a network device. For example, mouse movement at a computer (e.g., laptop, desktop, etc.); touch input activity, display I/O activity, or voice I/O activity at a mobile handset; or the like can be monitored to infer a level of activity associated with a device. Based on the inferred level of activity, a QoS configuration can be automatically selected for the device. For example, a device as described herein can be configured with "burst" and "background" settings such that a setting is selected for a device as necessary. In another example described herein, a device can have a "default" setting for periods of low activity and an "active" setting for periods of higher activity.

By implementing the network prioritization techniques described herein, a simple QoS steering mechanism can be utilized that suits requirements associated with both user experience and service provider efficiency requirements. Further, the techniques described herein can be implemented in a simpler and more cost-efficient manner as compared to conventional network management techniques, as fewer resources and costs are required to maintain a specific QoS for users engaged in active I/O as compared to maintaining the same QoS for all users.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
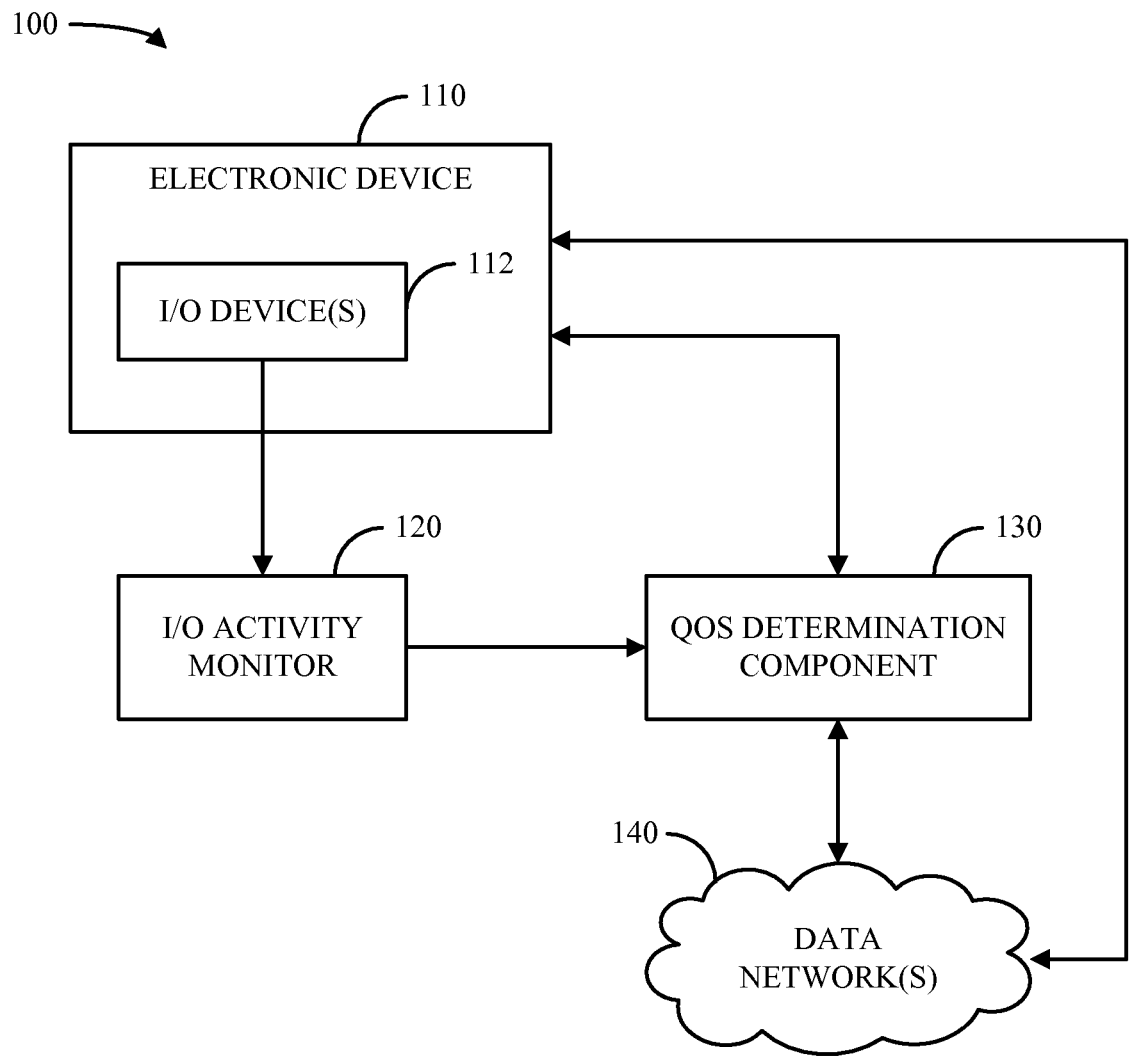
FIG. 1 is a block diagram of a system for managing communication in a data network in accordance with various aspects described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g. hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, it is to be appreciated that while various drawings are provided herein to illustrate respective example embodiments of the claimed subject matter, the embodiments illustrated herein are not necessarily to be construed as preferred or advantageous over other aspects or designs, nor are they meant to preclude equivalent structures and techniques known to those of ordinary skill in the art. Furthermore, it is to be appreciated that the various drawings are not drawn to scale from one figure to another nor inside a given figure, and in particular that the size of the components are arbitrarily drawn for facilitating the reading of the drawings.

Referring now to the drawings, FIG. 1 illustrates a block diagram of a system 100 for managing communication in a data network 140 in accordance with various aspects described herein. As FIG. 1 illustrates, system 100 can include an electronic device 110, which can communicate with one or more other entities over a data network 140. In one example, the electronic device 110 can include one or more I/O devices 112, which can include input devices such as a touch screen, mouse, keyboard, trackball, sensor array, microphone, or the like, as well as output devices like a display screen, speaker(s), or other suitable devices. In accordance with one aspect, a data network 140 with which an electronic device 110 communicates can be a wired and/or wireless network that can utilize any suitable networking technologies and/or protocols. While various example implementations described herein relate to a wireless data network that utilizes Third Generation Partnership Project (3GPP) standards, it should be appreciated that the various aspects described herein are not limited to such an implementation and that the hereto appended claims are intended to encompass any suitable wired and/or wireless data network implementation unless explicitly stated otherwise.

In accordance with one aspect, a data network 140 with which an electronic device 110 communicates can perform differently under various loading conditions. For example, when served by a heavily loaded data network 140, a device 110 can experience lower data throughput and higher latency. In one example, the impact of this degradation as experienced by the device 110 can depend on a level of activity between the device 110 and a user. For example, if a user is actively involved in an application (e.g., during a request for or viewing a web page), it can be appreciated that a user of the device 110 can be more likely to notice data network degradation. In contrast, if a user is not actively involved in an application (e.g., during reception of an e-mail or a large file transfer), a user can be less likely to notice data network degradation and in fact may not notice such degradation at all. Accordingly, system 100 can employ one or more mechanisms as described herein to identify active versus inactive interactions between a user and a device 110 and to automatically provide a device 110 with an appropriate level of QoS priority in an associated network 140 based on the identified interactions.

In accordance with another aspect, system 100 provides a simple QoS steering mechanism that can satisfy requirements for both user experience and service provider efficiency in a manner that is less complex and more cost-effective than existing alternatives. For example, many existing data networks operate by handling communication for all subscriber devices equally under all circumstances. However, if network degradation caused by loading and/or other factors nears specified limits, capacity upgrades are often implemented for all subscriber devices, which may or may not require or even notice the upgrades. As a result, it can be appreciated that the costs for the data service provider can significantly increase if network prioritization is not implemented.

Alternatively, various existing systems differentiate between subscriber devices based on fixed QoS assignments. Thus, for example, a high-priority subscriber can be allocated proportionally more resources during busy periods based on QoS attributes such as minimum and/or maximum bitrate settings. In such an example, a data service provider can focus upgrades to maintain performance for a highest priority subset of the total data traffic demand in the network. However, it can be appreciated that there can be cases in such an implementation where high-priority subscribers are over-served if they are not always actively engaged in real-time data applications. Further, it can be appreciated that other, lower priority subscribers, which may represent a large subset of the subscriber base within the network, may experience excessive latency when engaged in active I/O.

As another alternative, a QoS-aware device can perform mapping between applications and Access Point Name (APN) and/or QoS settings. However, this technique is similarly unlikely to yield optimal network usage for a variety of reasons. For example, application mapping is a complex operation and is becoming increasingly dynamic as devices become more open to third-party software, making such an operation difficult for network devices to perform. Further, it can be appreciated that changes to an application to APN or QoS mapping made in accordance with this technique must be pushed to respective devices over the air or via tethering each time a new application is loaded, and service providers generally lack the tools, information, and funding to maintain such mappings.

As a further alternative, the network can perform mapping between an application running at a device and QoS settings, but this technique can similarly be difficult to implement. For example, network devices are generally unable to provide information relating to applications utilized by the device to an associated network in sufficient detail to allow network-side mapping. In contrast, a network generally is aware only of the fact that a data application is executing at a device with no further detail. Further, even in cases where a device identifies its executing applications to the network, further detail relating to the characteristics of such applications is often not provided. For example, it can be desirable for a network to apply different priority settings for a device based on whether a given application is running in the foreground or the background of the device; however, this information is generally not made available to the network by the device.

Packet inspection and dynamic QoS is another network management technique that is traditionally utilized. In such a technique, packet inspection equipment is used to read the destination and flow of information sent on a data path. Based on this information, an attempt can be made to ascertain an application corresponding to the information and an optimal QoS for the information. Subsequently, a corresponding packet flow can be modified with new QoS attributes via packet delivery protocol (PDP) or the like to change an allocation of resources for the packet flow and/or its priority. However, it can be appreciated that this technique can be prohibitively complex and costly. Further, because this technique requires packet inspection, it can be appreciated that this technique cannot be utilized for encrypted data flows may also introduce potential privacy and network neutrality ramifications if interpreted as a means to restrict specific data applications and providers. In addition, it can be difficult for a service provider and packet inspection platform to have the necessary computing power to keep up with new applications and providers introduced on the network and their respective QoS requirements.

In view of the above existing network management techniques, system 100 can, in accordance with one aspect, utilize I/O activity sensing to automatically change QoS settings of a network device 110 and/or a priority level for traffic between the device 110 and an associated network 140. By doing so, system 100 can facilitate network management that meets user experience requirements as well as network efficiency requirements while additionally minimizing the resources and costs associated with such management. In addition, by utilizing I/O activity control to control network resources in order to maintain a target QoS for users engaged in active I/O, it can be appreciated that system 100 can require fewer resources and costs than a traditional network management scheme that maintains a given QoS for all network users.

In accordance with one aspect, system 100 can include an I/O activity monitor 120, which can monitor a level of I/O activity at an electronic device 110 associated with, for example, one or more I/O devices 112 associated with the electronic device 110. The I/O activity monitor 120 can be implemented in a variety of manners such as, for example, a software application stored and/or executed by the electronic device 110 (e.g., using a memory and/or processor), a hardware component associated with the electronic device 110 (e.g., a data card, network adapter, etc.), a hardware and/or software component independent of the electronic device 110, or the like. In one example, an I/O activity monitor 120 can determine I/O activity levels of any number of associated electronic devices 110.

In accordance with another aspect, information relating to an I/O activity level of an electronic device 110 can be provided from the I/O activity monitor 120 to a QoS determination component 130, which can utilize the provided information to prioritize one or more communication flows between the electronic device 110 and a data network 140. In one example, the QoS determination component 130 can further obtain information directly from the electronic device 110 relating to, for example, one or more applications being executed at the device 110, whether respective applications are running in the foreground or the background of the device 110, and/or other suitable information.

In one example, the QoS determination component 130 can utilize information obtained from the electronic device 110 and/or the I/O activity monitor 120 to assign a priority level to the electronic device 110 that is proportional to its level of activity. By way of example, if it is known that the electronic device 110 is a mobile handset and that a user is holding the device 110 while actively engaged in I/O activity with the device 110, the QoS determination component 130 can infer that the user is likely to be waiting on information from the data network 140. Accordingly, a substantially high level of priority can be assigned to the device 110 by the QoS determination component 130. Alternatively, if it is determined that the device 110 is not being held by a user and/or that the user is not engaged in I/O activity with the device 110, the QoS determination component 130 can instead infer that a user is not likely to be awaiting information from the data network 140. Accordingly, the QoS determination component 130 can apply a substantially low level of priority to the device 110 in order to enable communication between the device 110 and the data network 140 to occur in the background.

In accordance with one aspect, by adjusting QoS parameters to prioritize communications within system 100 in the above manner, the QoS determination component 130 can enable an electronic device 110 to provide an improved user experience with a high degree of efficiency. In one example, by ascertaining whether a user is interacting with a device 110 at a given point in time, the QoS determination component 130 can respond to changes in a user experience by adjusting the manner in which data is served to the device 110. By way of specific example, system 100 can be utilized in a data network with a substantially large number of electronic devices 110 for which a data network 140 receives data to communicate to the devices 110 substantially simultaneously. In such an example, a QoS determination component 130 can be utilized to prioritize the devices 110 into devices with a high degree of activity (e.g., devices more likely to be awaiting the data) and devices with a lower degree of activity (e.g., devices less likely to be awaiting the data) such that the network 140 can deliver the data to the high-priority devices prior to delivering the data to the remainder of the devices. By enabling the network 140 to deliver the data to the devices 110 in subsets, it can be appreciated that the costs associated with communicating the same information multiple times at substantially the same time can be significantly reduced.

Figure 2:
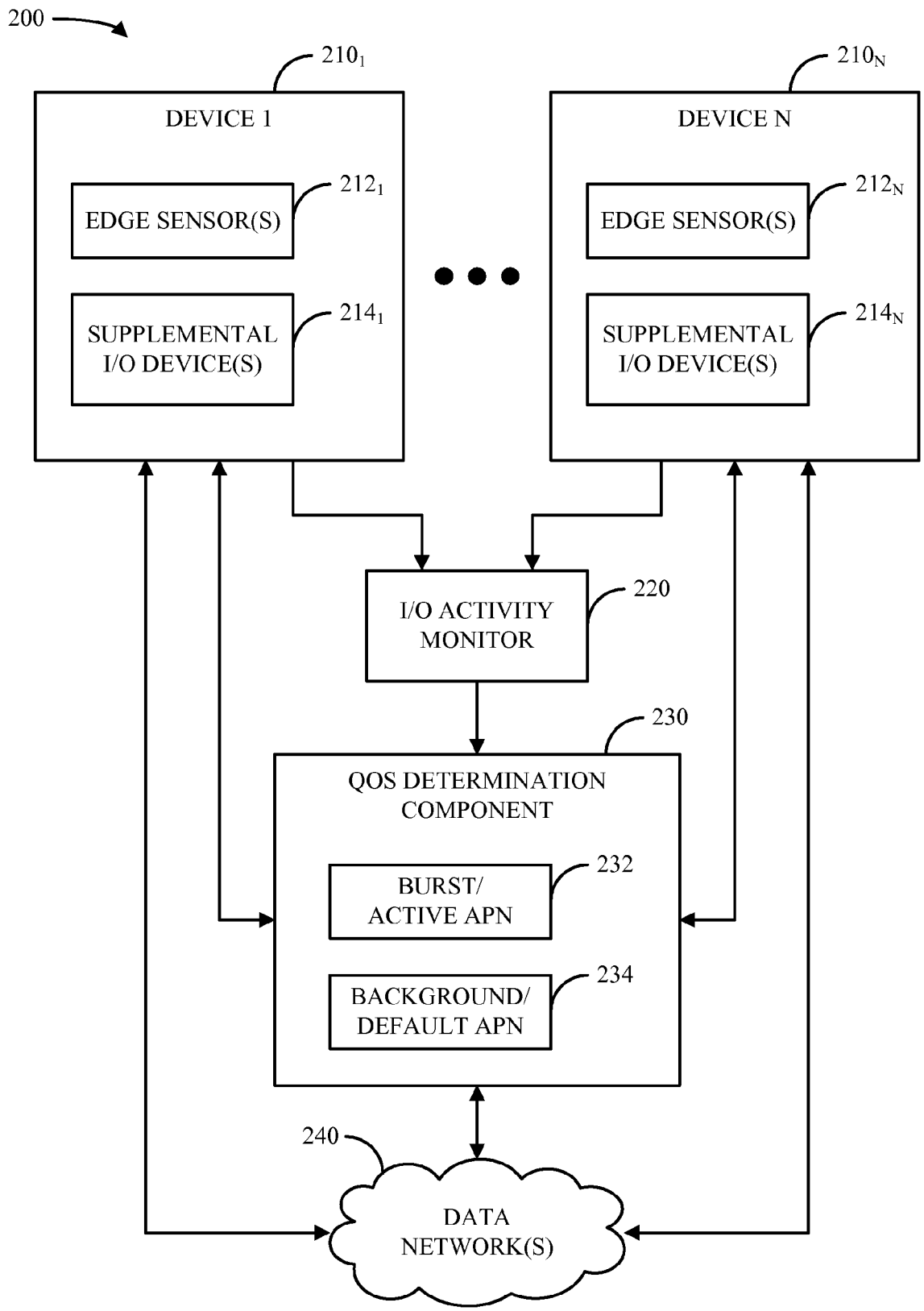
FIG. 2 is a block diagram of a system for prioritizing communication flows within a data network in accordance with various aspects.

Turning to FIG. 2, a system 200 for prioritizing communication flows within a data network 240 in accordance with various aspects is illustrated. In one example, system 200 can include one or more devices 210 that can communicate with one or more data networks 240. In accordance with one aspect, a device in system 200 can include one or more edge sensors 212 that can be affixed to respective edges of a device 210 to facilitate input at the device 210 as described in further detail infra. Additionally or alternatively, devices 210 in system 200 can include one or more supplemental I/O devices 214, such as a display, a touch screen, a keyboard or keypad, a mouse, a microphone, a speaker, or the like. In accordance with another aspect, an I/O activity monitor 220 can be utilized to monitor levels of I/O activity at respective devices 210 in system 200 in a similar manner to that described above with respect to system 100. While a single I/O activity monitor 220 is illustrated in system 200, it should be appreciated that system 200 can include any suitable number of I/O activity monitors 220, each of which can correspond to any number of devices 2 10.

In accordance with one aspect, activity level information from the I/O activity monitor 220 can be provided to a QoS determination component 230 to prioritize traffic between data network(s) 240 and device(s) 210 in system 200, thereby facilitating an enhanced user experience and increased system performance. In one example, information from respective devices 210, such as identities of applications running at the devices 210 and whether such applications are running in the foreground or background of the devices, can additionally be provided to the QoS determination component 230. As system 200 illustrates, the QoS determination component 230 can assign priority levels to respective devices 210 by assigning the devices 210 to one or more APN configurations 232-234 as follows.

Conventionally, a Universal Mobile Telecommunications System (UMTS) High Speed Data Packet Access (HSDPA) device can select an APN on a per-application basis, but due to the complexity traditionally associated with such selection an APN is typically used by default for all applications executing at a device. In contrast, devices 210 system 200 in accordance with one aspect can be provisioned for at least a burst (or "active") APN 232 or a background (or "default") APN 234 by the QoS determination component 230. In accordance with one aspect, respective device/APN pairs can be assigned corresponding QoS attributes by the QoS determination component 230. For example, the burst APN 232 can be associated with a relatively high minimum bitrate (e.g., 100 kbps) defined in the home location register (HLN), while the background APN 234 can be associated with a relatively low minimum bitrate (e.g., 0 kbps) defined in the HLR. Accordingly, under load, a data network 240 can be configured to provision more resources for flows with the higher minimum bitrate associated with the burst APN 232 as opposed to the lower minimum bitrate associated with the background APN 234. In one example, a single APN can be utilized as a burst APN 232 for a first subset of devices 232 and as a background APN 234 for a second subset of devices 234, thereby providing load balancing benefits.

In one example, respective applications associated with a network device 210 can be assigned a logical "default" APN 232 in the device. Upon receipt of an application request for a data flow on the default APN 232, the I/O activity monitor 220 can analyze the I/O status of the device 210. If the I/O status of the device 210 is determined by the I/O activity monitor 220 to be "active," the QoS determination component 230 can instruct the device 210 to request a PDP from the burst APN 232. Otherwise, if the I/O status of the device 210 is determined to be inactive, the device 210 can instead be instructed to request a PDP from the background APN 234. In another example, a device 210 in system 200 can have the ability to terminate and re-initiate PDP to facilitate changes to a utilized APN and/or other associated QoS parameters in the event that a change to the I/O status of the device 210 is detected by the I/O activity monitor 220. It can be appreciated that this scenario can occur for, by way of example, long file downloads and/or a device 210 with an "always on" PDP associated with services such as e-mail or the like.

By way of specific, non-limiting example, the QoS determination component 230 can instruct a device 210 and/or a data network 240 with which the device 210 communicates to use low priority (e.g., Traffic Handling Priority (THP) 3) unless the I/O activity monitor 220 has detected I/O activity at the device 210 within X seconds, where X is a number specified by an I/O inactivity timer. Accordingly, it can be ensured that most activity having a higher priority (e.g., THP2) occurs while a user is actively involved in I/O and likely waiting for information from the data network 240. Thus, pushing traffic associated with devices 210 that are not active in terms of I/O to a lower (e.g., THP3) priority level can ensure that active higher priority (e.g., THP2) users maintain their higher priority and that their experience is less degraded under network load.

With reference now to FIGS. 3-8, various techniques for utilizing sensors as an input mechanism for an electronic device are illustrated. It should be appreciated, however, that these techniques are provided merely as an example of input activity that can be considered in managing QoS parameters of a device and/or an associated data network and that, unless explicitly stated otherwise, the claimed subject matter is not intended to be limited to such techniques.

Figure 3:
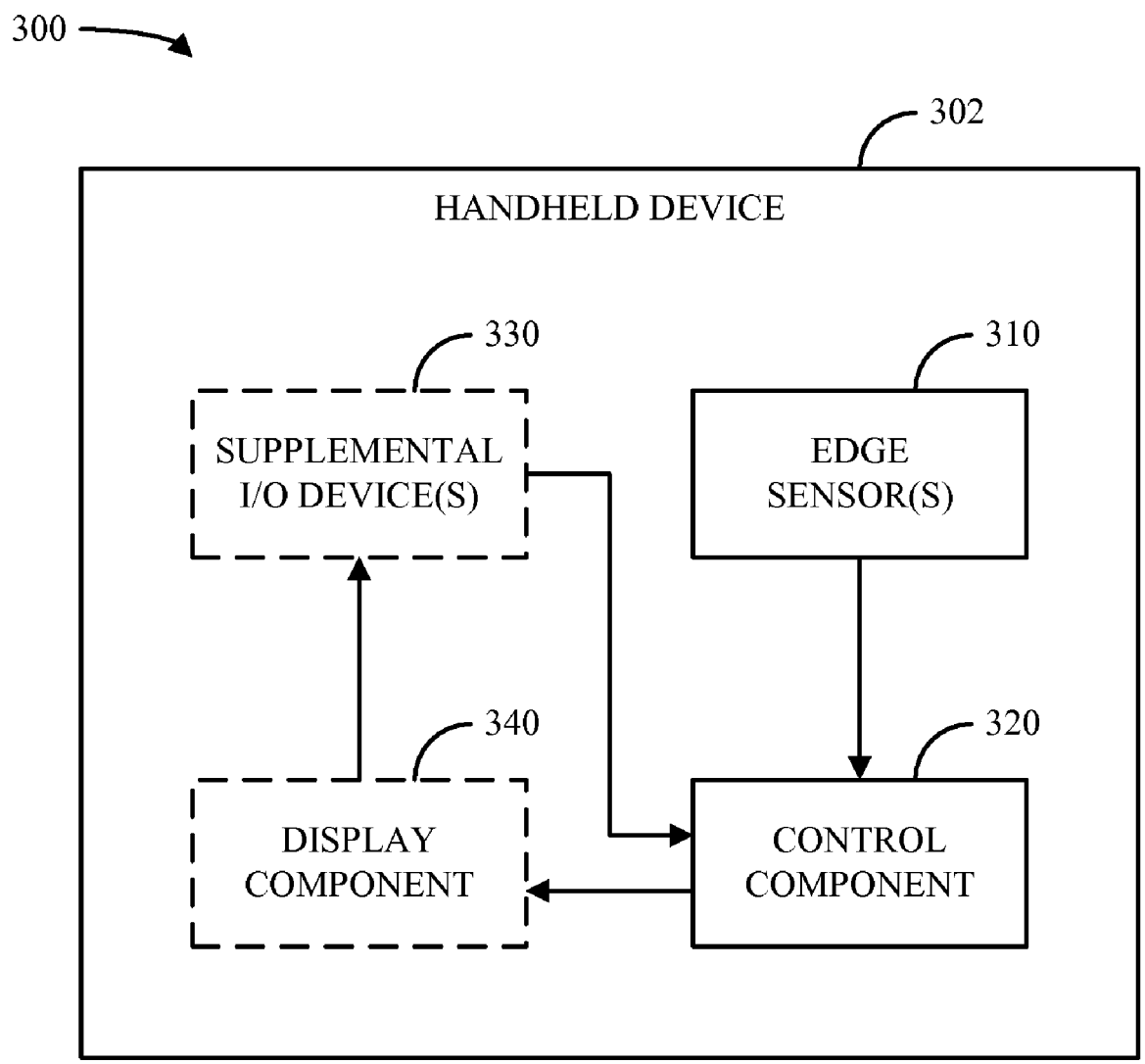
FIG. 3 is a block diagram of a system for controlling a handheld device in accordance with various aspects.

Referring now to FIG. 3, a system 300 for controlling a handheld device 302 in accordance with various aspects described herein is illustrated. It can be appreciated that handheld device 302 illustrated by FIG. 3 can be any suitable portable or non-portable device such as, for example, a mobile telephone handset, electronic game system and/or game controller, musical instrument, Global Positioning System (GPS) receiver, Personal Digital Assistant (PDAs), smartphone, package tracking device, laptop and/or tablet computer, virtual reality system, and/or any other appropriate type of device.

In accordance with one aspect, handheld device 302 can include one or more edge sensors 310 to provide improved input functionality by facilitating additional control options in a limited amount of space provided at the device 302. For example, edge sensor(s) 310 can be applied to one or more side and/or back edges of a device, thereby allowing inputs normally associated with a touch-screen and/or a mechanical button, dial, or other control to be implemented using the sides of the device 302.

In accordance with one aspect, edge sensors 310 can utilize capacitive, resistive, touch-sensitive, and/or any other suitable sensing technology to detect the presence and/or motion of a user's fingers and/or hands with respect to the edges of an associated device 302. For example, edge sensors 310 can be utilized to monitor the presence or absence of skin contact at various points along the edges of a handheld device. Further, when presence of skin contact is detected, various parameters of various contact points, such as the location, width, spacing, count, pressure, and/or movement of the contact points, can be utilized by the edge sensors 310 to infer the presence and location of a user's hands and/or fingers along the edges of the device 302. In one example, this information can be provided to a control component 320, which can facilitate the control of one or more features and/or applications executed by the device 302. For example, the control component 320 can facilitate a mapping of various points along edge sensor(s) 310 to respective soft keys, which can be manipulated by a user to control operation of the device 302.

In accordance with another aspect, inputs provided by edge sensor(s) 310 can be utilized by the control component 320 in combination with one or more optional supplemental input/output (I/O) device 330, such as a keyboard, numeric keypad, touch-screen, trackball, keyboard, mouse, etc., to provide input for one or more applications and/or features of the device 302. In another example, the control component 320 can manage an optional display component 340 to provide visual information relating to one or more applications and/or features of a handheld device 302 being executed by a user.

Figure 4:
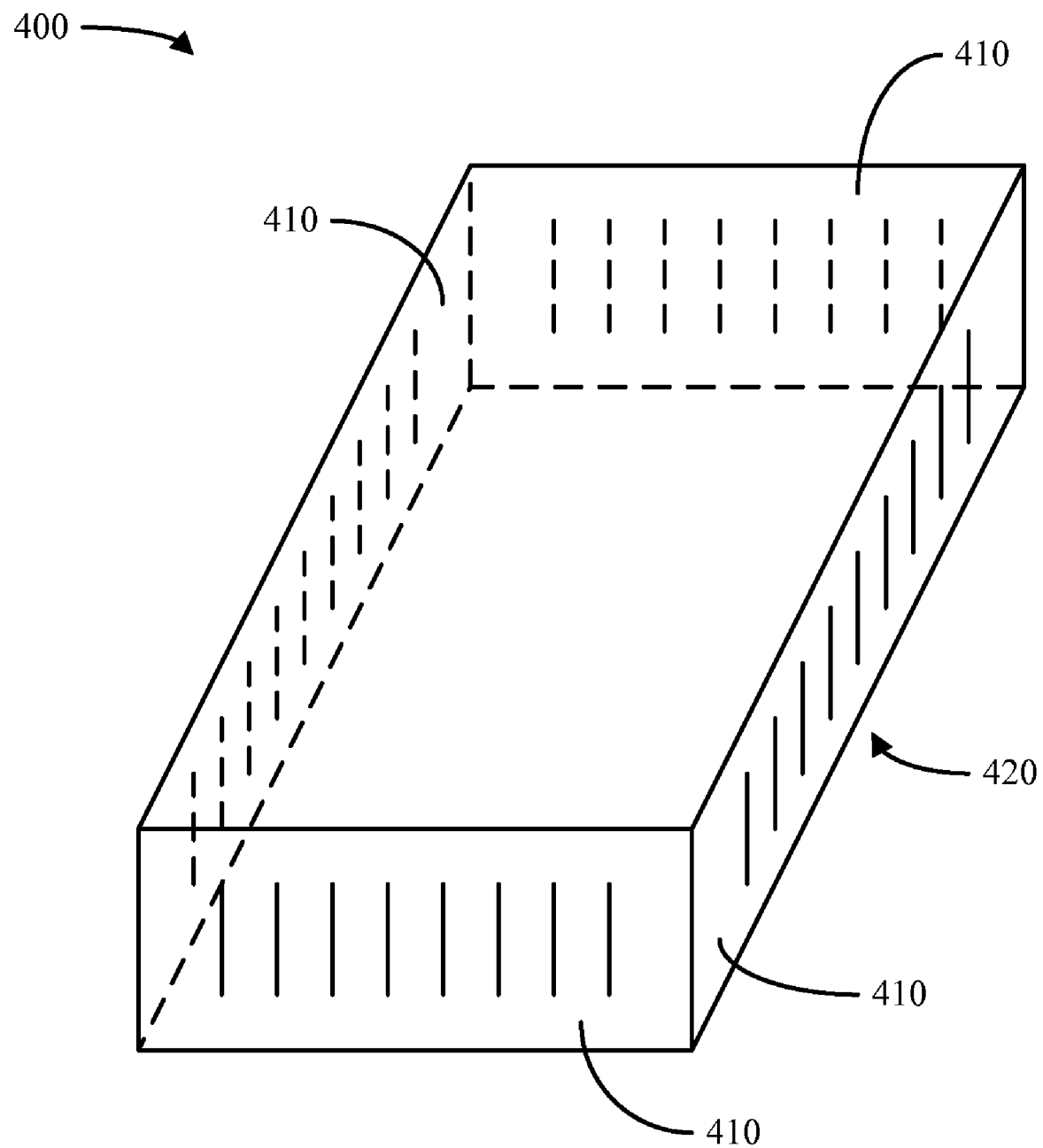
FIG. 4 illustrates an example sensor implementation for an electronic device in accordance with various aspects.

Turning now to FIG. 4, a diagram 400 is provided that illustrates an example sensor implementation for an electronic device (e.g. handheld device 304) in accordance with various aspects. In one example, one or more edge sensors 410 can be affixed and/or otherwise placed at the side edges of a device as illustrated by diagram 400. Additionally and/or alternatively, a back sensor 420 can be placed at the back edge of the device. In accordance with one aspect, side sensors 410 and/or a back sensor 440 can be faceted, such that a plurality of touch points are provided along the length of each sensor 410 and/or 420. As illustrated in diagram 400, touch points at side sensors 410 are divided by vertical lines along each sensor 410. Additionally and/or alternatively, it can be appreciated that touch points could also be implemented across the width of the sensors 410 and/or 420, thereby creating a two-dimensional array of touch points across each sensor 410 and/or 420.

In accordance with another aspect, edge sensors 410 and/or back sensor 420 can be implemented using any suitable sensing technology or combination of technologies, such as capacitive sensing, resistive sensing, touch or pressure sensing, and/or any other suitable sensing technology that can be placed along the edges of an associated device as illustrated by diagram 400. While various example implementations are described herein in the context of capacitive sensing, it should be appreciated that capacitive sensing is only one implementation that can be utilized and that, unless explicitly stated otherwise in the claims, the claimed subject matter is not intended to be limited to such an implementation.

Figure 5:
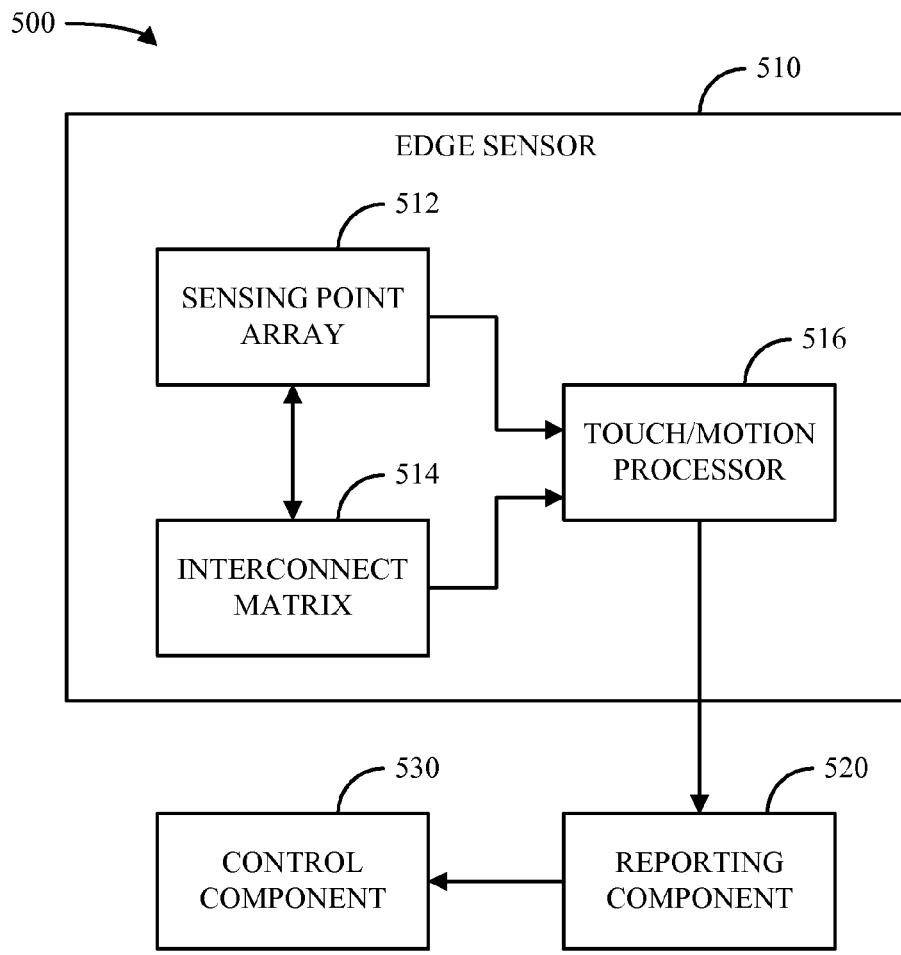
FIG. 5 is a block diagram of a system for controlling a handheld device in accordance with various aspects.

Referring now to FIG. 5, a system 500 for controlling a handheld device in accordance with various aspects is illustrated. In one example, system 500 can include an edge sensor 510, which can be applied to one or more outer edges of an associated device as generally described herein. In accordance with one aspect, edge sensor 510 can include one or more sensing points arranged in a linear array 512 and an interconnection matrix 514 that joins the sensing points in the array 512.

In one example, edge sensor 510 can be segmented as illustrated by diagram 200 such that various sensing points in the sensing point array 512 correspond to respective locations along the edge sensor 510. Accordingly, the sensing point array 512 and/or interconnection matrix 514 can be monitored by a touch and motion processor 516 that detects and reports the presence or absence of skin contact (e.g., from a user's hands and/or fingers) at various points along the edge sensor 510 based on changes in capacitance, resistance, pressure, or the like observed at the sensing points. In accordance with one example, a reporting component 520 can be utilized to report information obtained by the touch and motion processor 516 to a control component 530, which can in turn utilize the information as input for one or more applications.

In one example, touch and motion processor 516 can monitor relationships between adjacent sensing points, the grouping of contacts, separation of contact points, a number of detected contact points, and/or other similar observations to detect the presence and/or positioning of the hands and/or fingers of a user relative to the edge sensor 510. Techniques by which the touch and motion processor 516 can perform such monitoring and detection are provided in further detail in the following description.

Figure 6:
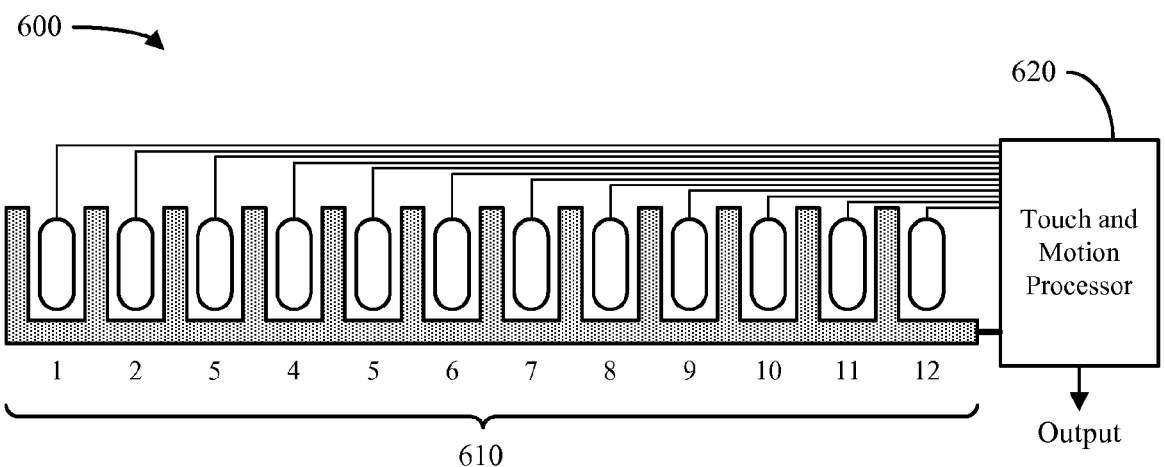
FIG. 6 illustrates an example implementation for an edge sensor in accordance with various aspects.

Turning to FIG. 6, a diagram 600 is provided that illustrates an example implementation for an edge sensor in accordance with various aspects described herein. As diagram 600 illustrates, an edge sensor can include an array of sensing points 610, which can be joined by an interconnection matrix and/or coupled to a touch and motion processor 620. In accordance with one aspect, sensing points 610 can utilize changes in capacitance, resistance, pressure, and/or any other suitable property or combination of properties to sense the presence or absence of skin contact with the sensing points 610. Diagram 600 illustrates an array of 12 sensing points 610 for purposes of clarity of illustration; however, it should be appreciated that any number of sensing points 610 can be utilized in conjunction with an edge sensor as described herein.

Figure 7:
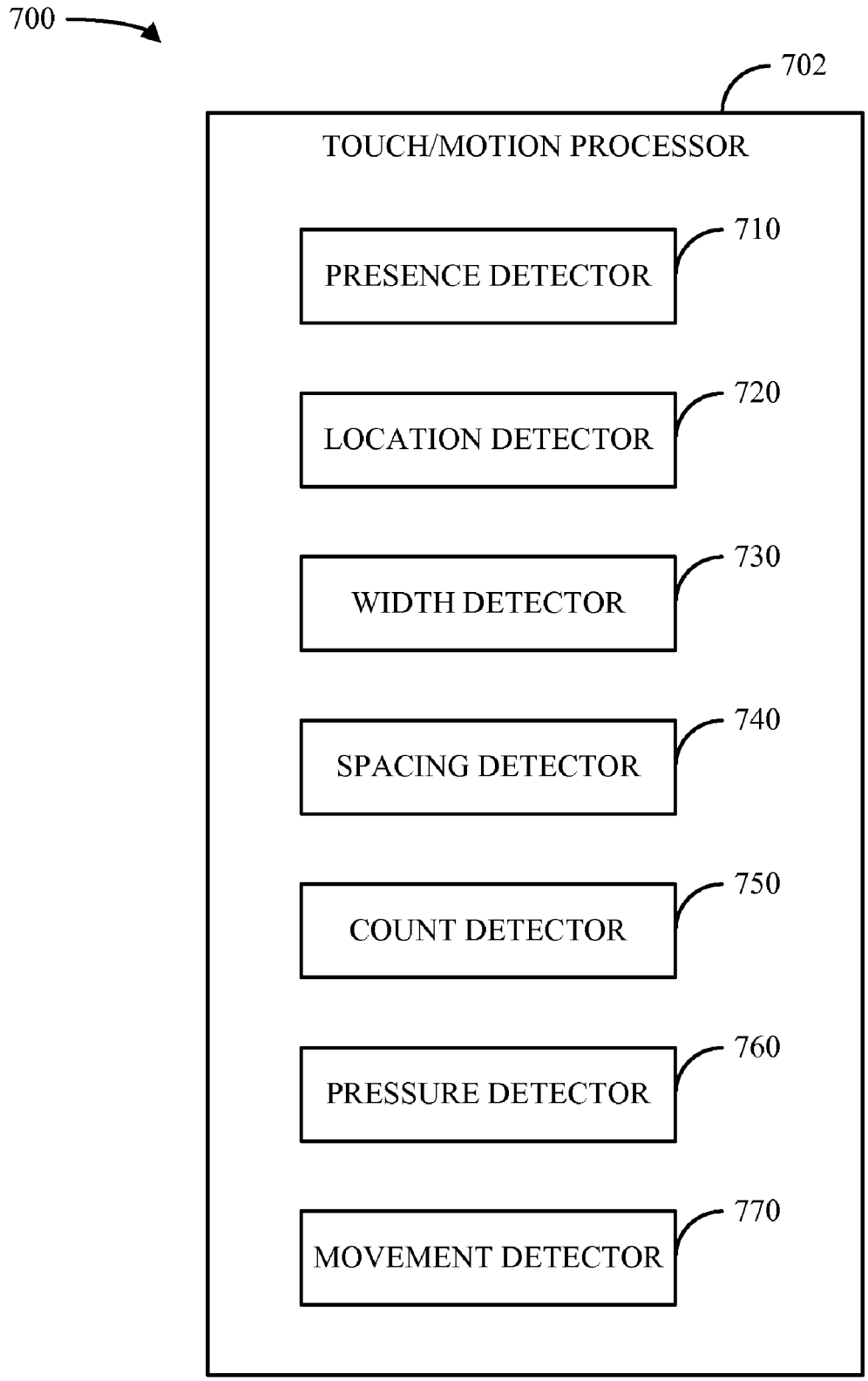
FIG. 7 is a block diagram of a system for processing sensor contacts in accordance with various aspects.

Referring now to FIG. 7, a block diagram of a system 700 for processing sensor contacts in accordance with various aspects is illustrated. In one example, system 700 can include a touch/motion processor 702 associated with a sensor applied to an electronic device as generally described herein. Touch/motion processor 702 can include one or more detectors 710-770, which can respectively detect presence, location, width, spacing, count, pressure, and/or movement of touch points between an associated device edge and a user's hand. It can be appreciated that detectors 710-780 are provided by way of example and that, in various implementations, a touch/motion processor can implement fewer than the detectors 710-770 illustrated in FIG. 7 and/or one or more detectors not illustrated in FIG. 7.

In accordance with various aspects, detectors 710-770 can operate as follows. For example, presence detector 710 can detect the presence or absence of contacts between a user's hand and/or fingers and an associated edge sensor, as illustrated by diagram 802 in FIG. 8. In one example, if a given sensing point on an associated sensor exhibits a change in capacitance (or another suitable property), presence detector 710 can determine that there is contact on some point along the perimeter of the device corresponding to the sensor. In another example, contact detected by presence detector, or lack thereof, can be utilized by touch/motion processor 702 that the device is either in or out of a user's hand.

Figure 8:
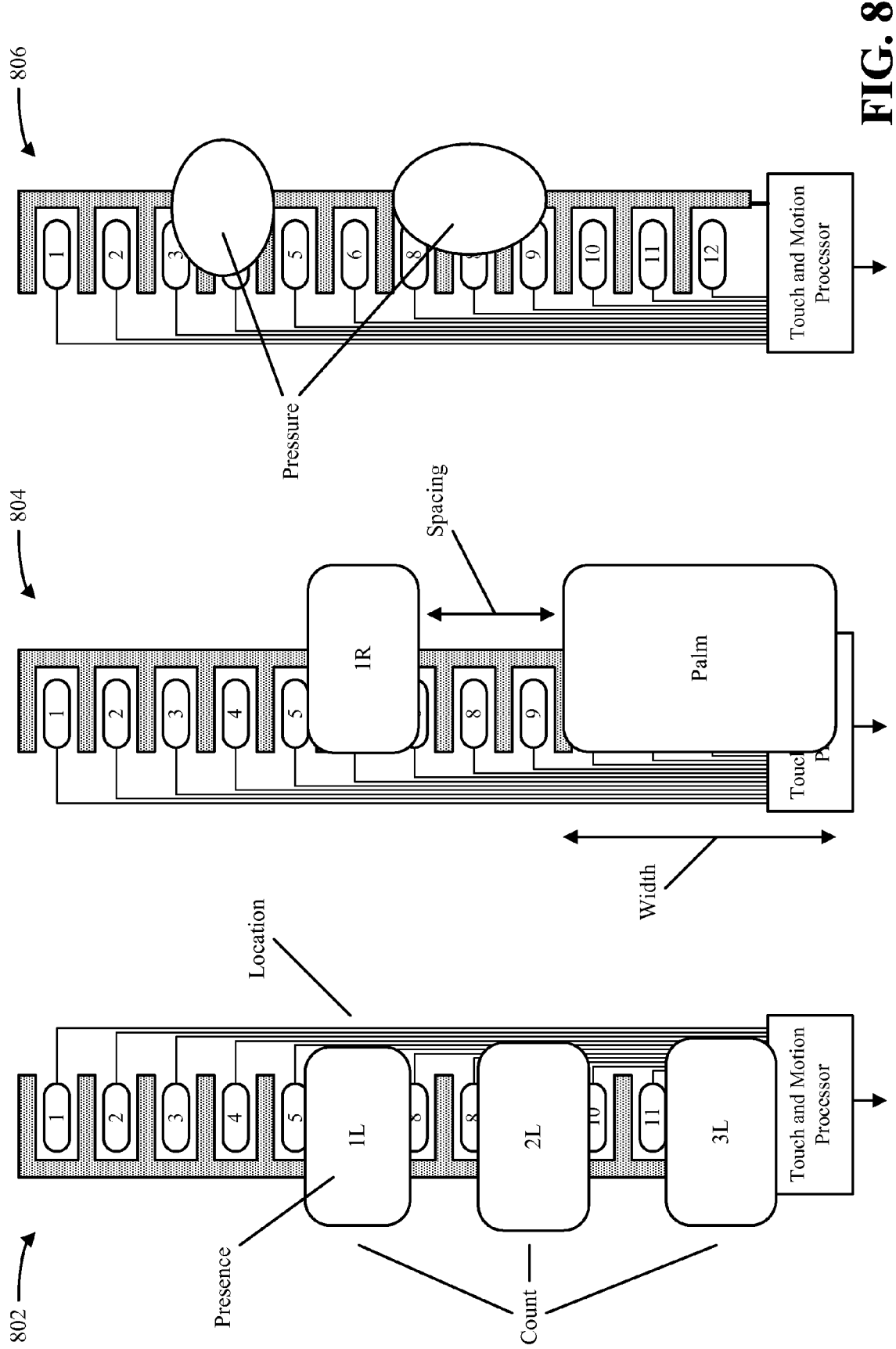
FIG. 8 illustrates example measurements relating to sensor contacts that can be performed in accordance with various aspects.

In accordance with another aspect, location detector 720 can be utilized to determine the location of one or more contacts on an associated sensor as illustrated by diagram 802 in FIG. 8. In one example, respective sensing points on an associated sensor can be numbered and have respective known locations along the sensing point array. Accordingly, when a specific sensing point exhibits a change in capacitance and/or another suitable property, location detector 720 can be utilized to determine the location of contact.

Width detector 730 can be utilized to determine the width of a contact with an associated edge sensor, as illustrated by diagram 804 in FIG. 8. In one example, a substantially large number of sensing points can be provided on a sensor and spaced closely together such that a finger or palm spans multiple sensing points. Accordingly, width detector 730 can attempt to identify consecutive strings of contacted sensing points, based on which contact width can be determined. In accordance with one aspect, contact width as determined by width detector 730 can be utilized to determine whether contact was made by, for example, a finger, a palm, or a thumb of the user. In one example, width detector 730 can define the center of a contact as the middle point between the distant ends of the contacted sensing point string.

In accordance with another aspect, spacing detector 740 can be utilized to determine the spacing between multiple detected contacts, as illustrated by diagram 804 in FIG. 8. In one example, spacing detector 740 can determine spacing between contacts by identifying non-contacted sensing points that span gaps between contacted sensing points. Accordingly, it can be appreciated that small strings of non-contacted sensing points can indicate close spacing, while long strings of non-contacted sensing points can indicate distant spacing. This information can be used by touch/motion processor 702 to, for example, ascertain the relationship between contact points to determine the presence of a thumb and palm versus adjacent fingers.

In accordance with a further aspect, count detector 750 can be utilized to detect the number of distinct contacts made with an associated sensor, as illustrated by diagram 802 in FIG. 8. In one example, count detector 750 can regard respective consecutive strings of adjacent contacted sensing points as indicating an object (e.g., finger, thumb, palm, etc.) touching the associated device edge. Accordingly, count detector 750 can utilize this information to ascertain the number of objects touching one or more edges of the device.

Pressure detector 760 can be utilized to detect respective pressures of contacts to an associated sensor. In accordance with one aspect, pressure detector 760 can utilize variance in one or more properties of fingers and/or other objects contacting the sensor with pressure as illustrated by diagram 806 in FIG. 8. For example, it can be observed that fingers, palms, and the like tend to spread (e.g., creating more linear contact) as additional pressure is applied. Thus, in the example illustrated by diagram 806 in FIG. 8, a relatively light amount of pressure has been applied to the top-most contact point while heavier pressure has been applied to the lower contact point. As a result, it can be appreciated that an object influences more sensing points when pressed firmly versus lightly. Accordingly, pressure detector 760 can utilize this information to determine changes in applied pressure at one or more contact points. In one example, pressure detector 760 can measure relative changes in pressure and/or absolute pressure values at one or more contact points. In another example, the operation of pressure detector 760 can be normalized on a per-user basis in order to allow pressure detector 760 to adapt to the size, shape, and/or other properties of the hands and/or fingers of a particular user.

In accordance with another aspect, movement detector 770 can be utilized to detect movement of one or more contacts along an associated sensor. In one example, consecutive strings of contacted sensing points corresponding to a contact point can shift up and down if the object (e.g., finger, thumb, palm, etc.) making the contact is moved along the length of the sensor. Accordingly, movement detector 770 can use this information to ascertain movement of any object touching the device edge.

In one example, touch/motion processor 702 can report measurements from detectors 710-770 on a periodic basis. These reports can subsequently be utilized by, for example, various applications that are dependent on control inputs from the edge of an associated device in order to facilitate control of such applications.

Figure 9:
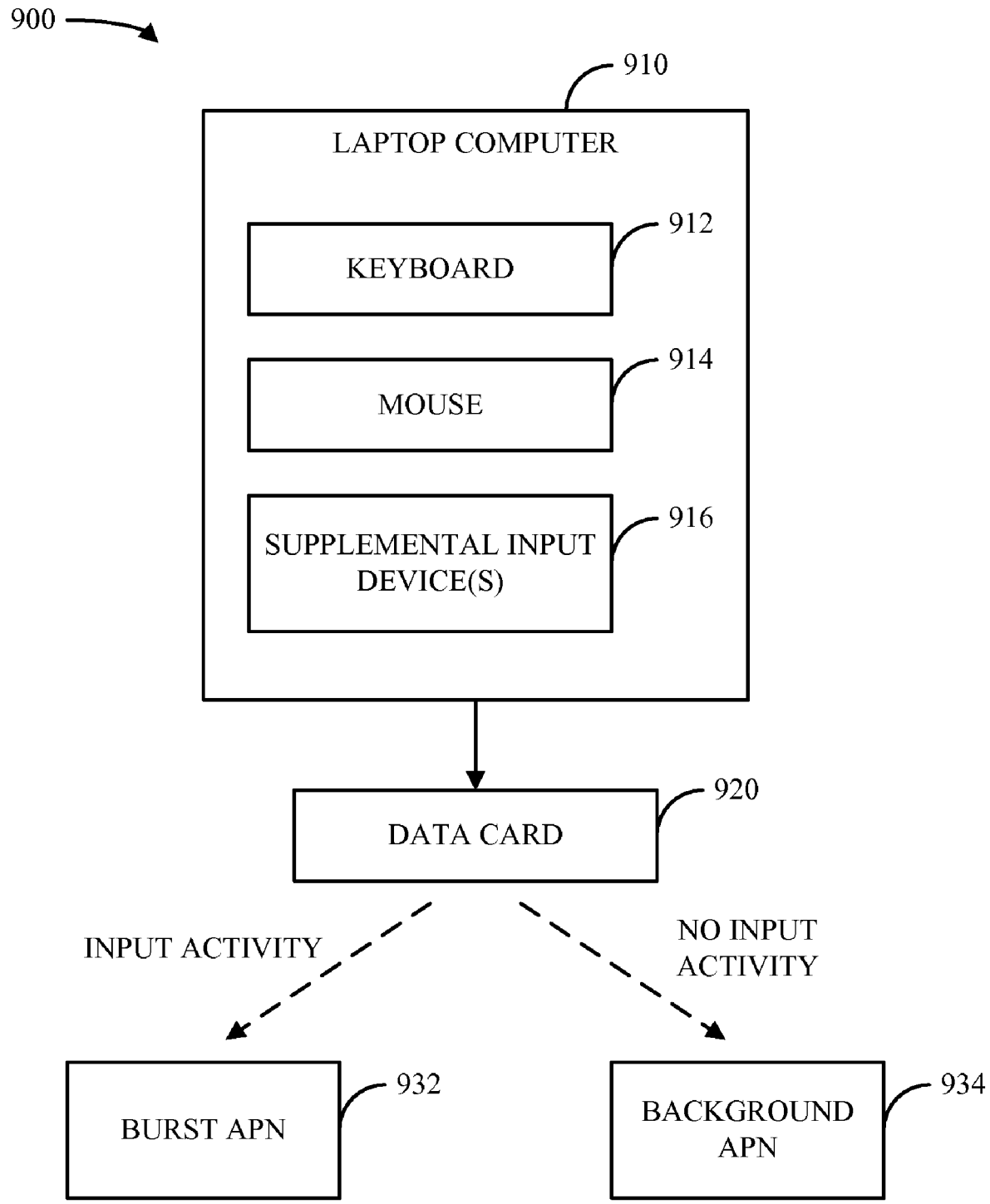
FIG. 9 illustrates a system for assigning a traffic priority for a laptop computer in accordance with various aspects.
Figure 10:
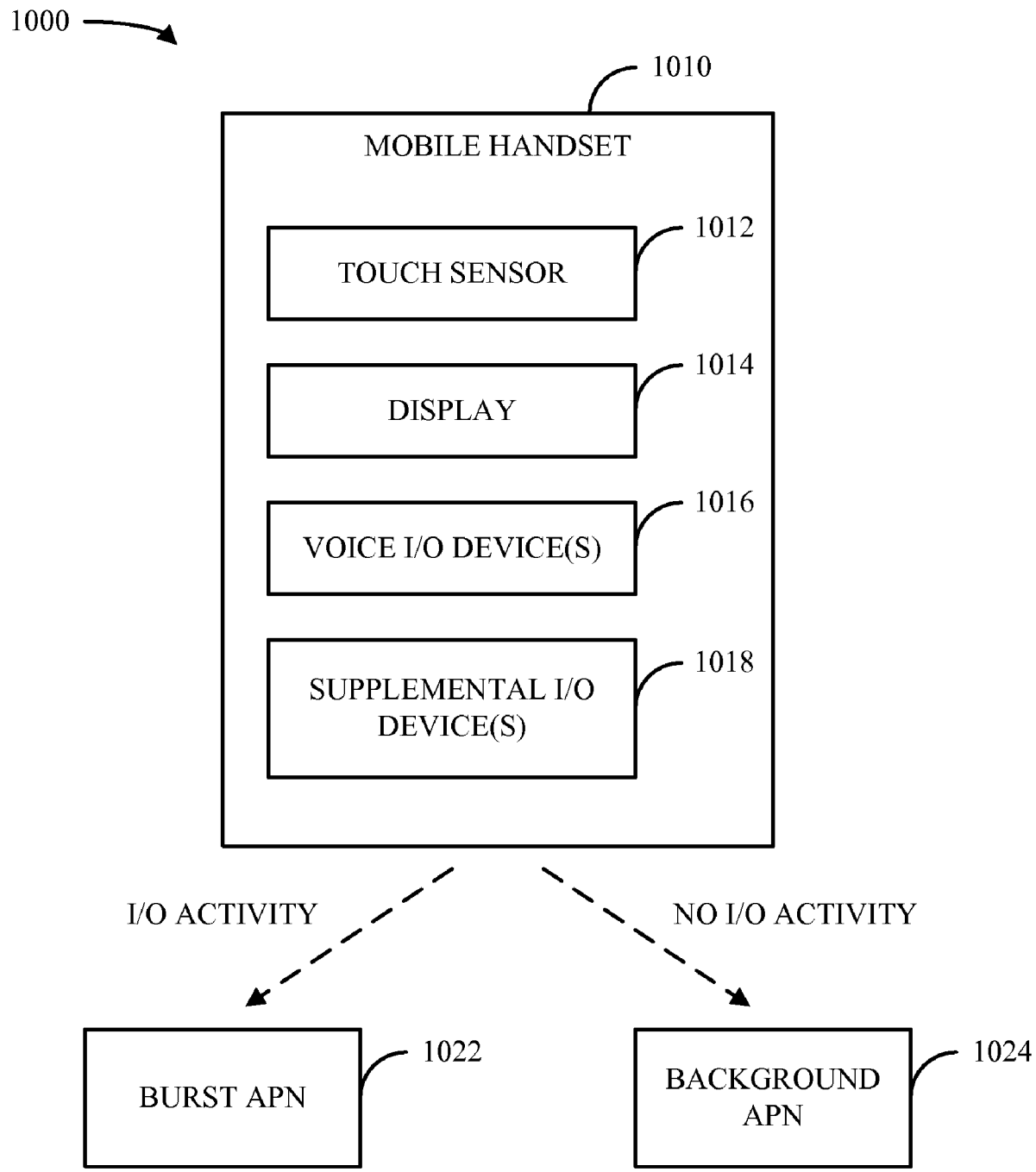
FIG. 10 illustrates a system for assigning a communication priority for a mobile handset device in accordance with various aspects.

With reference now to FIGS. 9-10, block diagrams of respective systems 900-1000 for I/O activity monitoring and traffic prioritization are provided for specific device types. It should be appreciated that FIGS. 9-10 and their associated description are provided by way of example and not limitation, and that unless explicitly stated otherwise the claimed subject matter is not intended to be limited to such examples.

Turning to FIG. 9, a system 900 for assigning a traffic priority for a laptop computer 910 in accordance with various aspects is illustrated. It should be appreciated, however, that while system 900 and the following description relate to a laptop computer, system 900 could additionally or alternatively be utilized to assign traffic priority for any other suitable type of electronic device (e.g., a desktop computer, a PDA, etc.). In one example, laptop computer 910 in system 900 can include input devices such as a keyboard 912, a mouse 914, and/or one or more other, supplemental input devices 916. In accordance with one aspect, a data card 920 and/or another suitable entity associated with the laptop computer 910 can monitor activity of input devices 912-916 and report the level of input activity associated with the laptop computer 910 to one or more data networks.

In accordance with one aspect, input activity (e.g., mouse movement, keyboard activity, etc.) while a data application is executing in the foreground of a computing device such as a laptop computer 910 can be monitored by data card 920 to determine whether a user is awaiting data. For example, input activity can serve as an indication that a user has requested and is awaiting delivery of data (e.g. a web page, etc.) for the application. In contrast, the lack of input activity for a data application can be regarded as an indication that the user is either processing information that has already been received or that the user has moved onto another application (e.g., while awaiting a file transfer). Accordingly, a data card 920 associated with a laptop computer 910 can assign the laptop computer to a burst APN 932 if input activity is detected or a background APN 934 if no input activity is detected. In one example, the burst APN 932 can be utilized for real-time interactive data activity and utilize a high QoS setting (e.g., THP 2) with a high minimum bitrate (e.g. 100 kbps), while the background APN 934 can be utilized for non-real-time data activity and have a lower associated QoS setting (e.g., THP 3) and minimum bitrate (e.g., 0 kbps). In another example, the data card 920 can utilize one or more activity timers in connection with switching between the burst APN 932 and the background APN 934 to avoid triggering frequent unnecessary QoS changes due to intermittent input activity.

With reference next to FIG. 10, a system 1000 for assigning a communication priority for a mobile handset device 1010 in accordance with various aspects is illustrated. It should be appreciated, however, that while system 1000 and the following description relate to a mobile handset, system 1000 could additionally or alternatively be utilized to assign traffic priority for any other suitable type of electronic device. In one example, mobile handset 1010 in system 1000 can include I/O devices such as a touch sensor 1012 (e.g., a touch screen and/or edge sensor), a display 1014, voice I/O device(s) 1016 (e.g., a microphone and/or speakers), and/or one or more other, supplemental input devices 1018. In accordance with one aspect, the mobile handset 1010 can monitor the activity of its associated I/O devices 1012-1018 and assign itself a traffic priority level based on the monitored level of I/O activity. For example, the mobile handset can associate with a burst APN 1022 upon detecting I/O activity or a background APN 1024 upon detecting a lack of I/O activity. In one example, burst APN 1022 and/or background APN 1024 can function in a similar manner to APNs 932-934 in system 900.

Figure 11:
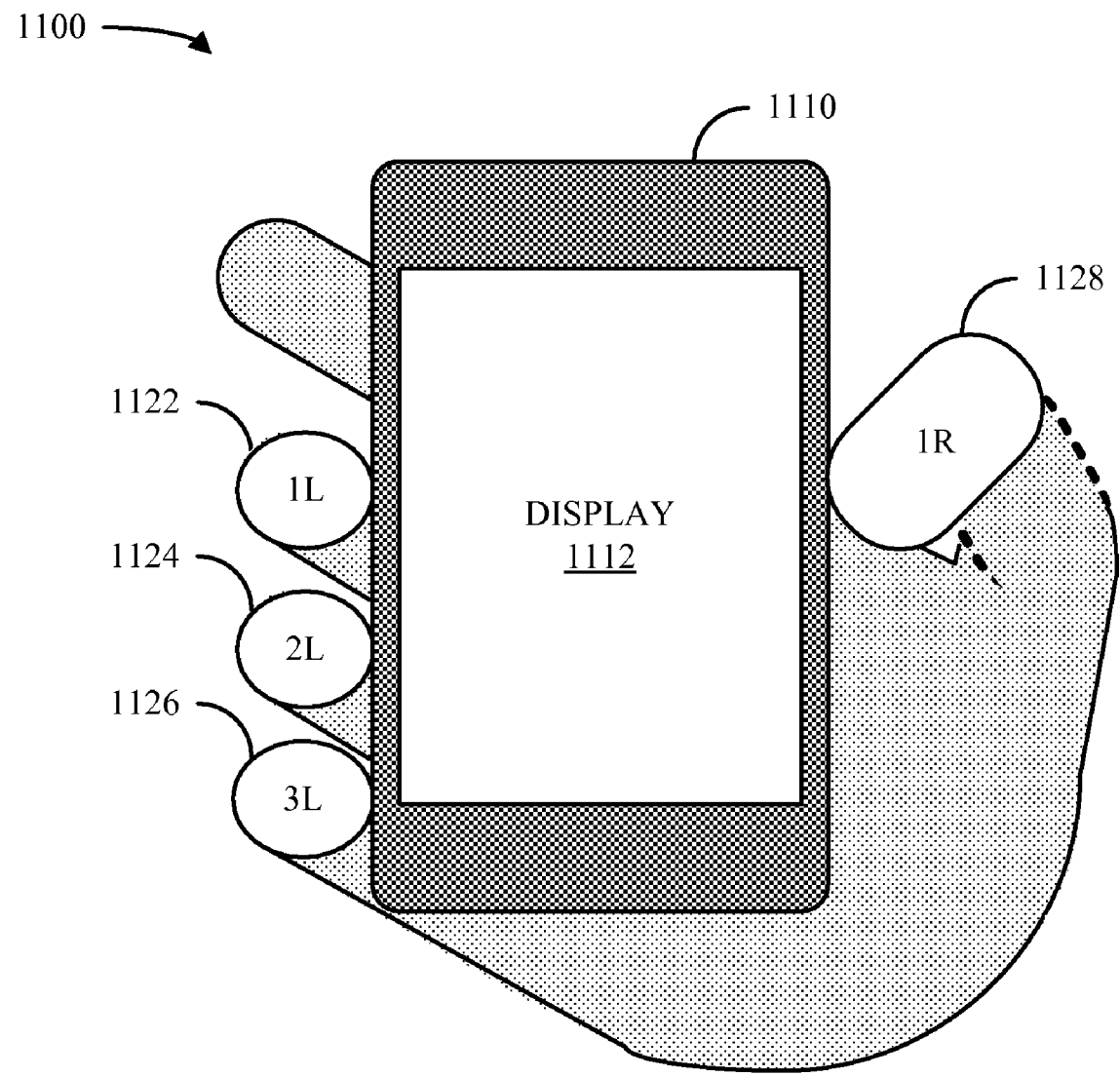
FIGS. 11-12 illustrate example techniques for monitoring input/output activity of a handheld electronic device in accordance with various aspects.

In one example, mobile handset 1010 can determine its level of I/O activity in various manners based on whether the mobile handset 1010 is in or out of a user's hand. For example, as diagram 1100 in FIG. 11 illustrates, if a handset device 1110 determines based on the positioning of a user's fingers 1122-1126 and/or thumb 1128 (e.g., as identified by edge sensors associated with the device 1100) that the handset device 1100 is in a user's hand, the device 1100 can monitor the status of an associated display 1112. If the display 1112 is activated, the device 1110 can infer from the fact that the user is holding the device 1110 and the display 1112 is active that the user is actively engaged with the device 1110 and/or is awaiting delivery of real-time information to the device 1110. Accordingly, the device 1110 can utilize a burst APN. Otherwise, the device 1110 can select and utilize a background APN.

Figure 12:
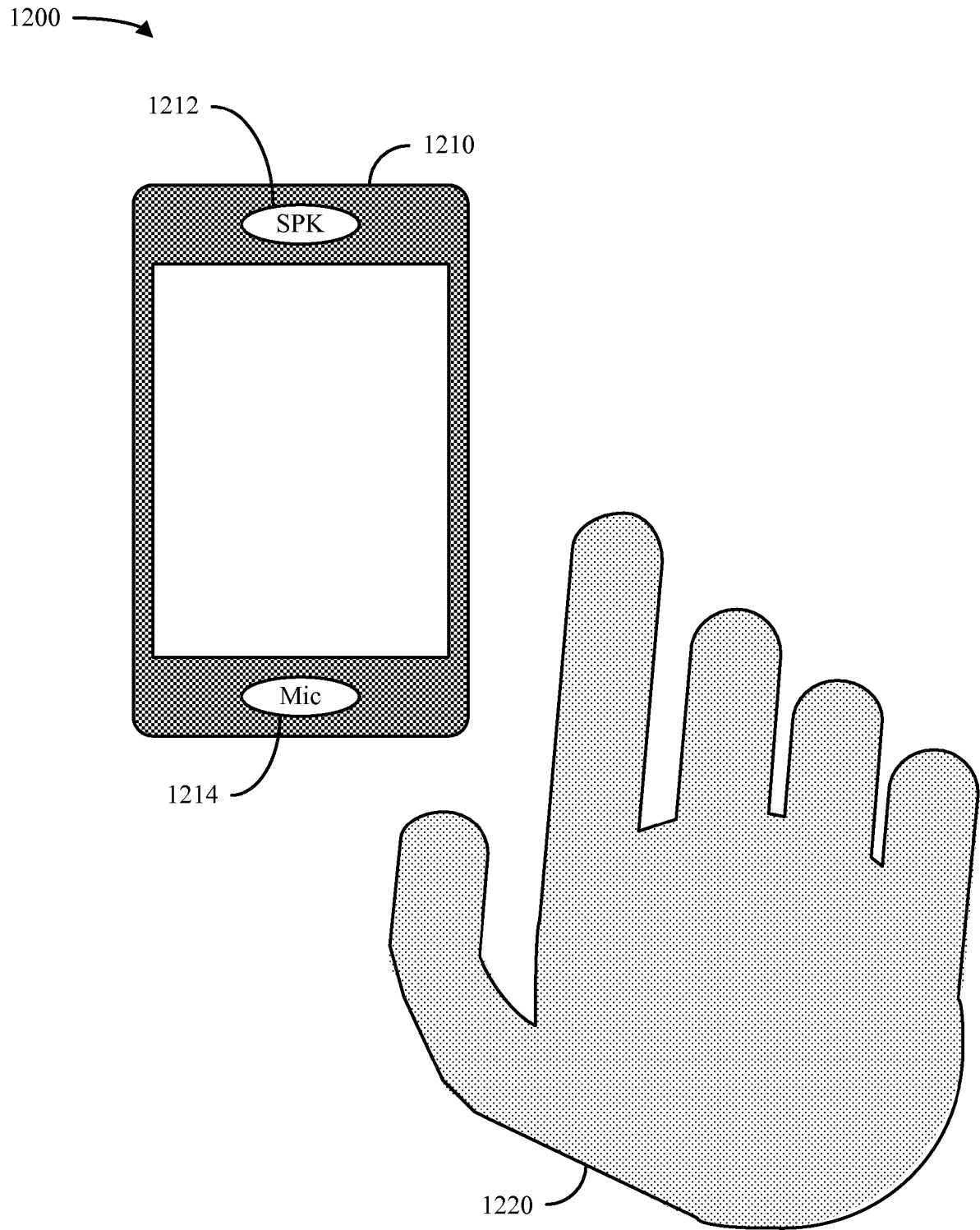

In another example illustrated by diagram 1200 in FIG. 12, if it is instead determined that a device 1210 is out of a user's hand 1220, the device 1210 can instead monitor voice I/O activity at, for example, a speaker (SPK) 1212 and/or microphone 1214. In one example, if a user is providing voice commands to the device 1210 via a microphone 1214, it can be inferred that a user is actively engaged with the device 1210 and/or is awaiting delivery of real-time information to the device 1210. Accordingly, the device 1210 can utilize a burst APN. Otherwise, the device 1210 can select and utilize a background APN.

With reference again to FIG. 10, it can be appreciated that the mobile handset 1010 can additionally or alternatively determine whether I/O activity is present and associate with a corresponding APN 1022 or 1024 in various other manners. For example, the mobile handset 1010 can monitor the on/off state of a Global Positioning System (GPS) receiver at the handset 1010. Based on the GPS on/off state, the mobile handset 1010 can associate with the burst APN 1022 if GPS is active or the background APN 1024 if GPS is inactive.

Figure 13:
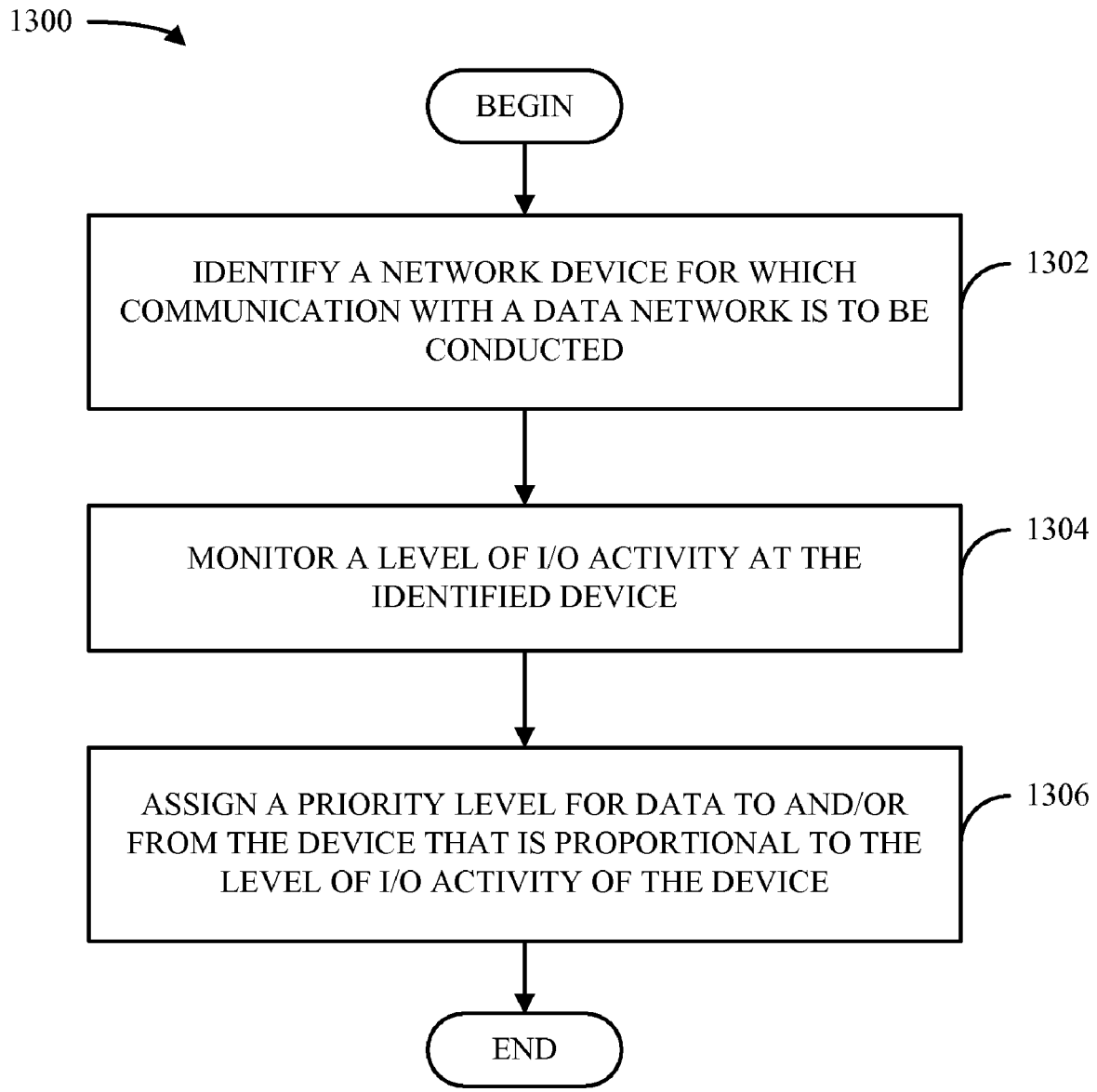
FIG. 13 is a flowchart of a method for managing QoS attributes of a communication system.
Figure 14:
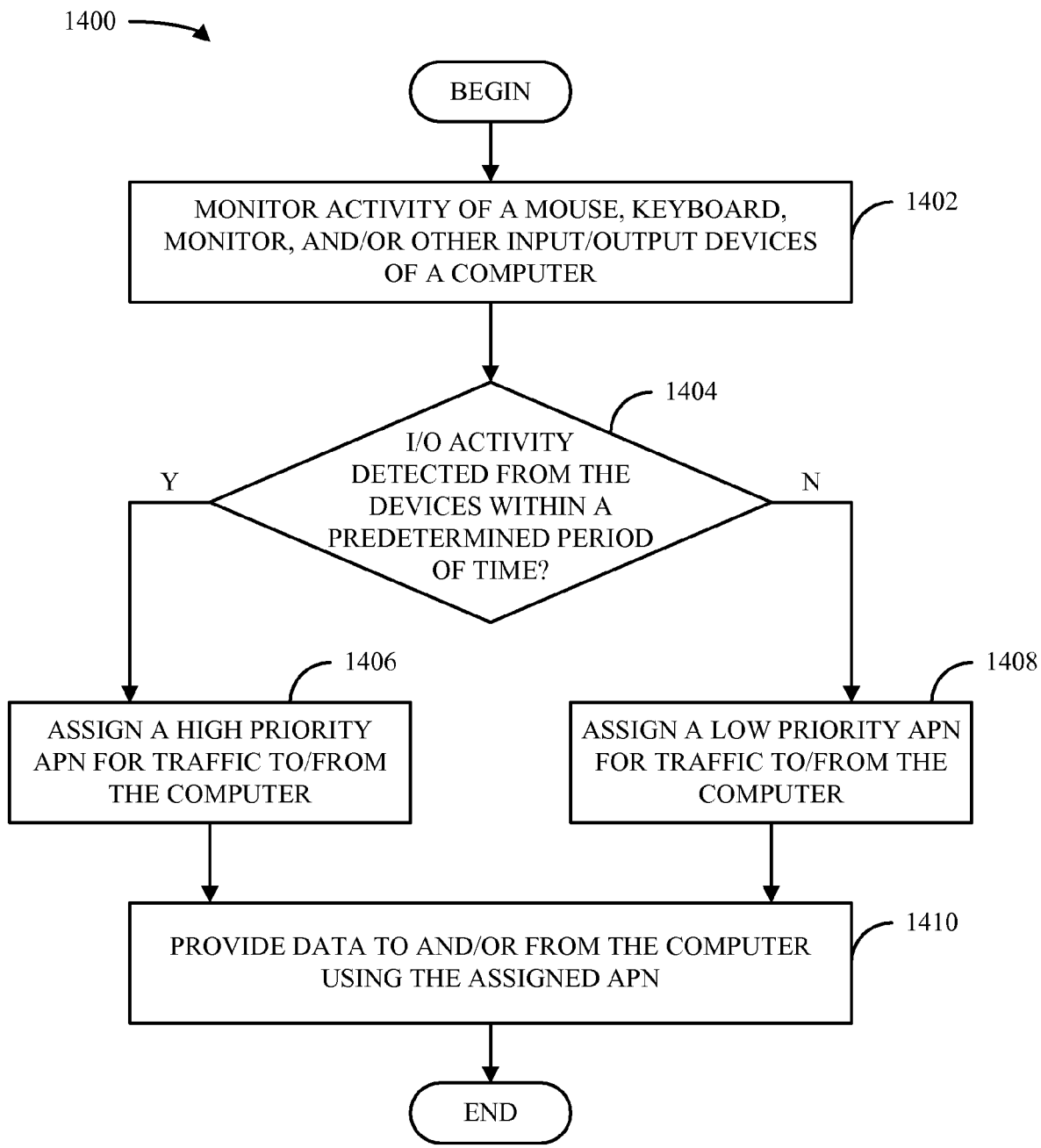
FIG. 14 is a flowchart of a method for assigning a communication priority for a computer based on an observed level of input/output activity.
Figure 15:
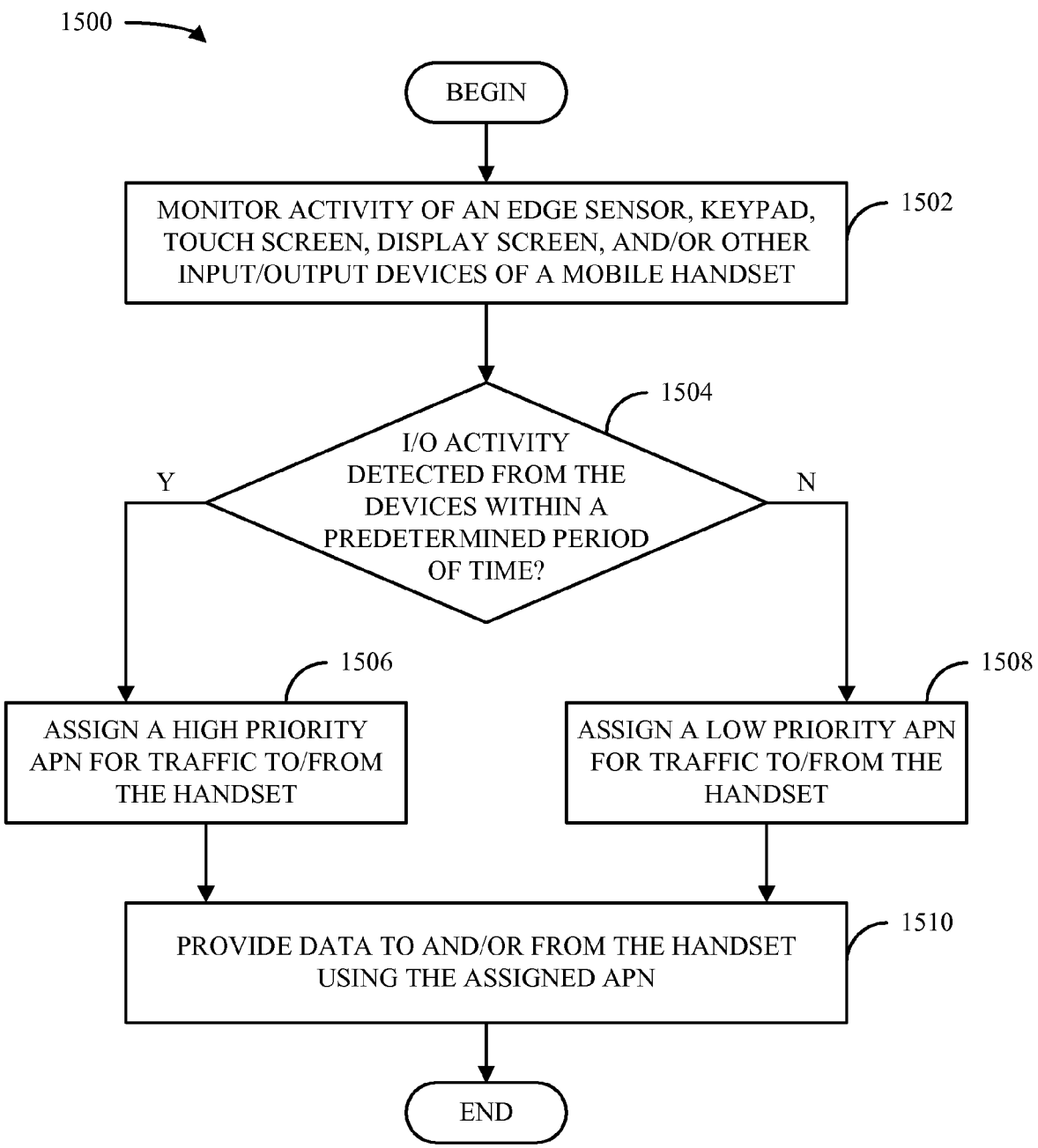
FIG. 15 is a flowchart of a method for assigning a communication priority for a mobile handset based on an observed level of input/output activity.

Turning to FIGS. 13-15, methodologies that may be implemented in accordance with various aspects described herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 13, a method 1300 for managing QoS attributes of a communication system (e.g., system 100) is illustrated. At 1302, a network device (e.g. device 110) to which communication with a data network (e.g. network 140) is to be conducted is identified. At 1304, a level of I/O activity at the device identified at 1302 is monitored (e.g., by an I/O activity monitor 120). At 1306, a priority level is assigned for data to and/or from the device (e.g., by a QoS determination component 130) that is proportional to the level of I/O activity at the device as monitored at 1304.

Turning now to FIG. 14, a flowchart is provided that illustrates a non-limiting example method 1400 of assigning a communication priority for a computer (e.g., a laptop computer 910) based on an observed level of input/output activity. At 1402, activity of a mouse (e.g., mouse 914), keyboard (e.g., keyboard 912), monitor, and/or one or more other I/O devices of a computer (e.g., supplemental input device(s) 916) are monitored (e.g. by a data card 920). At 1404, it is determined whether I/O activity has been detected from the devices monitored at 1402 within a predetermined amount of time. If I/O activity has been detected, method 1400 proceeds to 1406, wherein a high priority APN (e.g., burst APN 932) is assigned for traffic to and/or from the computer. Otherwise, method 1400 proceeds to 1408, wherein a low priority APN (e.g., background APN 934) is assigned for traffic to and/or from the computer. After completing the acts described at either 1406 or 1408, method 1400 then concludes at 1410, wherein data is provided to and/or from the computer using the APN assigned at 1406 or 1408.

FIG. 15 illustrates a non-limiting example method 1500 for assigning a communication priority for a mobile handset (e.g. mobile handset 1010) based on an observed level of input/output activity. At 1502, activity of an edge sensor (e.g., a touch sensor 1012), keypad, touch screen (e.g., touch sensor 1012 and/or display 1014), display screen, and/or other I/O devices of a mobile handset (e.g., I/O devices 1016 and/or 1018) are monitored. At 1504, it is determined whether I/O activity has been detected from the devices monitored at 1502 within a predetermined amount of time. If I/O activity has been detected, method 1500 proceeds to 1506, wherein a high priority APN (e.g., burst APN 1022) is assigned for traffic to and/or from the handset. Otherwise, method 1500 proceeds to 1508, wherein a low priority APN (e.g. background APN 1024) is assigned for traffic to and/or from the handset. After completing the acts described at either 1506 or 1508, method 1500 then concludes at 1510, wherein data is provided to and/or from the handset using the APN assigned at 1506 or 1508.

Figure 16:
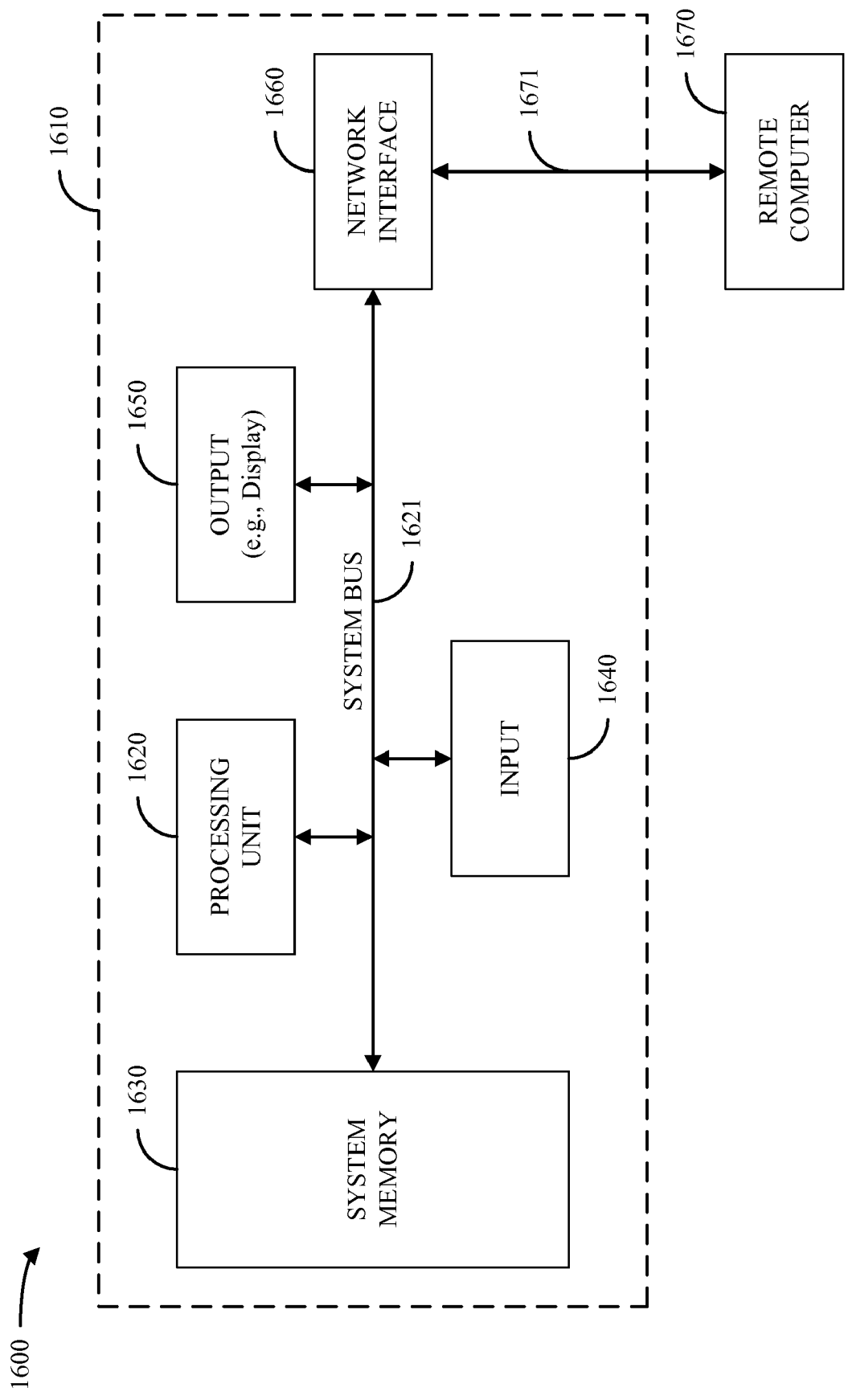
FIG. 16 is a block diagram of a computing system in which various aspects described herein can function.

Referring to FIG. 16, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g. anywhere that a network can be desirably configured. Accordingly, the below general purpose computing system described below in FIG. 16 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 16 thus illustrates an example of a suitable computing system environment 1600 in which the claimed subject matter can be implemented, although as made clear above, the computing system environment 1600 is only one example of a suitable computing environment for a media device and is not intended to suggest any limitation as to the scope of use or functionality of the claimed subject matter. Further, the computing environment 1600 is not intended to suggest any dependency or requirement relating to the claimed subject matter and any one or combination of components illustrated in the example operating environment 1600.

With reference to FIG. 16, an example of a computing environment 1600 for implementing various aspects described herein includes a general purpose computing device in the form of a computer 1610. Components of computer 1610 can include, but are not limited to, a processing unit 1620, a system memory 1630, and a system bus 1621 that couples various system components including the system memory to the processing unit 1620. The system bus 1621 can be any of several types of bus structures including a memory bus or memory controller, a peripheral bus, and a local bus using any of a variety of bus architectures.

Computer 1610 can include a variety of computer readable media. Computer readable media can be any available media that can be accessed by computer 1610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610. Communication media can embody computer readable instructions, data structures, program modules or other data in a modulated data signal such as a carrier wave or other transport mechanism and can include any suitable information delivery media.

The system memory 1630 can include computer storage media in the form of volatile and/or nonvolatile memory such as read only memory (ROM) and/or random access memory (RAM). A basic input/output system (BIOS), containing the basic routines that help to transfer information between elements within computer 1610, such as during start-up, can be stored in memory 1630. Memory 1630 can also contain data and/or program modules that are immediately accessible to and/or presently being operated on by processing unit 1620. By way of non-limiting example, memory 1630 can also include an operating system, application programs, other program modules, and program data.

The computer 1610 can also include other removable/non-removable, volatile/nonvolatile computer storage media. For example, computer 1610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1621 through a non-removable memory interface such as an interface, and a magnetic disk drive or optical disk drive can be connected to the system bus 1621 by a removable memory interface, such as an interface.

A user can enter commands and information into the computer 1610 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1620 through user input 1640 and associated interface(s) that are coupled to the system bus 1621, but can be connected by other interface and bus structures, such as a parallel port, game port or a universal serial bus (USB). A graphics subsystem can also be connected to the system bus 1621. In addition, a monitor or other type of display device can be connected to the system bus 1621 via an interface, such as output interface 1650, which can in turn communicate with video memory. In addition to a monitor, computers can also include other peripheral output devices, such as speakers and/or a printer, which can also be connected through output interface 1650.

The computer 1610 can operate in a networked or distributed environment using logical connections to one or more other remote computers, such as remote computer 1670, which can in turn have media capabilities different from device 1610. The remote computer 1670 can be a personal computer, a server, a router, a network PC, a peer device or other common network node, and/or any other remote media consumption or transmission device, and can include any or all of the elements described above relative to the computer 1610. The logical connections depicted in FIG. 16 include a network 1671, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 1610 is connected to the LAN 1671 through a network interface or adapter. When used in a WAN networking environment, the computer 1610 can include a communications component, such as a modem, or other means for establishing communications over the WAN, such as the Internet. A communications component, such as a modem, which can be internal or external, can be connected to the system bus 1621 via the user input interface at input 1640 and/or other appropriate mechanism. In a networked environment, program modules depicted relative to the computer 1610, or portions thereof, can be stored in a remote memory storage device. It should be appreciated that the network connections shown and described are non-limiting examples and that other means of establishing a communications link between the computers can be used.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for managing quality of service, comprising:
an input/output activity monitor configured to determine whether a user is actively interacting with a user device based upon identifying a level of input activity within a predetermined time period indicating that the user is holding the user device; and
a quality of service determination component configured to assign a quality of service level to communication between the user device and a data network based on the determination, wherein the quality of service level is a first priority level for communication between the user device and the data network in response to determining that the user is actively interacting with the user device, and the quality of service level is a second priority level that is lower than the first priority level for communication between the user device and the data network in response to determining that the user is not actively interacting with the user device.

2. The system of claim 1, wherein the quality of service determination component is further configured to associate the user device with a setting indicating a burst access point name if the input/output activity monitor determines that the user is actively interacting with the user device or a setting indicating a background access point name if the input/output activity monitor determines that the user is not actively interacting with the user device.

3. The system of claim 2, wherein the data network is configured to provide a communication for a plurality of user devices to user devices with which the setting indicating the burst access point name has been associated prior to providing the communication to user devices with which the setting indicating the background access point name has been associated.

4. The system of claim 1, wherein the user device is a computer comprising one or more of a mouse or a keyboard and the input/output activity monitor identifies the level of input activity associated with at least one of the mouse or the keyboard.

5. The system of claim 1, further comprising a data card configured to act as one or more of the input/output activity monitor or the quality of service determination component.

6. The system of claim 1, wherein the user device is a mobile handset device.

7. The system of claim 1, wherein the user device comprises one or more of touch sensors affixed to respective edges of the user device, a touch screen, or a display screen, and the input/output activity monitor identifies a level of one or more of sensor input or display output associated with the user device.

8. The system of claim 1, wherein the user device comprises one or more of a microphone or a speaker and the input/output activity monitor identifies at least one of voice input to the user device or audio output from the user device.

9. The system of claim 1, wherein the user device comprises a global positioning system receiver and the input/output activity monitor identifies whether the global positioning system receiver is on or off.

10. The system of claim 1, wherein the quality of service determination component is further configured to identify one or more applications executing at the user device and assign the quality of service level to communication between the user device and the data network based in part on the one or more applications.

11. A method of managing quality of service attributes of a communication system, comprising:
identifying a handheld device and a data network with which the handheld device is to communicate;
monitoring a level of input/output activity associated with the handheld device within a predetermined time period indicating whether a user is holding the user device;
determining whether the user is holding the handheld device based upon the monitoring; and
assigning a priority level for communication between the handheld device and the data network based upon the determining, wherein the priority level is a first priority level for communication between the handheld device and the data network in response to determining that the user is holding the handheld device, and the priority level is a second priority level that is lower than the first priority level for communication between the handheld device and the data network in response to determining that the user is not holding the handheld device.

12. The method of claim 11, wherein the priority level is proportional to the monitored level of input/output activity.

13. The method of claim 12, wherein the assigning comprises one or more of the following acts:
assigning an active access point name to the handheld device in response to determining that the user is holding the handheld device; or
assigning a default access point name to the handheld device in response to determining that the user is not holding the handheld device.

14. The method of claim 13, further comprising:
identifying a plurality of handheld devices to which the data network is configured to communicate a set of information;
communicating the set of information from the data network to respective handheld devices to which the active access point name has been assigned; and
after the communicating of the set of information to the respective handheld devices to which the active access point name has been assigned, communicating the set of information from the data network to respective handheld devices to which the default access point name has been assigned.

15. The method of claim 11, wherein the monitoring comprises monitoring interaction between the user of the handheld device and one or more of a mouse or keyboard associated with the handheld device.

16. The method of claim 11, wherein the monitoring comprises:
   determining that the handheld device is in a hand of the user; and
   monitoring one or more of activity of a display associated with the handheld device or interaction between the user and a touch sensor associated with the handheld device.

17. The method of claim 11, wherein the monitoring comprises:
   determining that the handheld device is not in a hand of the user; and
   monitoring one or more of activity of a speaker associated with the handheld device or interaction between the user and microphone associated with the handheld device.

18. The method of claim 11, wherein the assigning further comprises:
   identifying one or more applications executing at the handheld device with which the user of the handheld device is interacting; and
   assigning the priority level for communication between the handheld device and the data network based at least in part on the one or more applications.

19. A non-transitory computer readable storage medium comprising computer executable instructions that, in response to execution by a computing system, cause the computing system to perform operations, comprising:
   determining whether a user is actively interacting with a user device based upon one or more inputs from the user to the user device within a predetermined time period indicating that the user is holding the user device; and
   assigning a first priority level for communication between the user device and an associated data network in response to determining that the user is actively interacting with the user device; and
   assigning a second priority level that is lower than the first priority level for communication between the user device and the associated data network in response to determining that the user is not actively interacting with the user device.

* * * * *